June 25, 1963    R. E. GOERZ    3,094,886
PROCESS OF MAKING A DIE ASSEMBLY
Filed June 26, 1961    3 Sheets-Sheet 1

INVENTOR.
RICHARD E. GOERZ
BY
Reynolds + Christensen
ATTORNEYS

June 25, 1963 R. E. GOERZ 3,094,886
PROCESS OF MAKING A DIE ASSEMBLY
Filed June 26, 1961 3 Sheets-Sheet 2
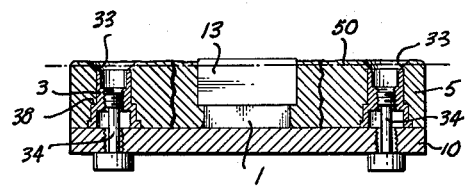
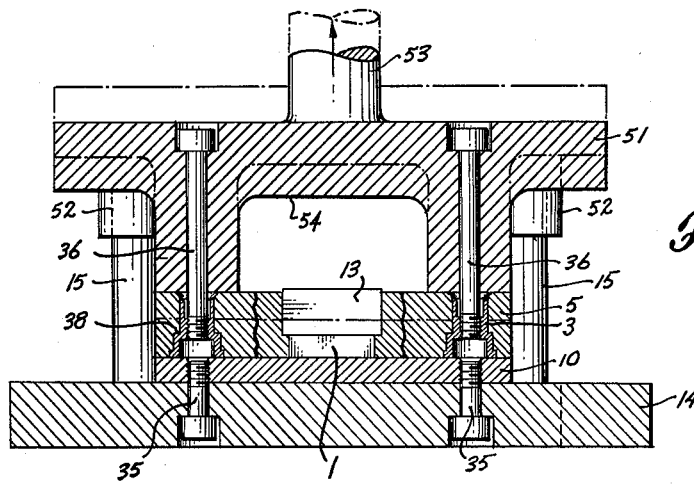
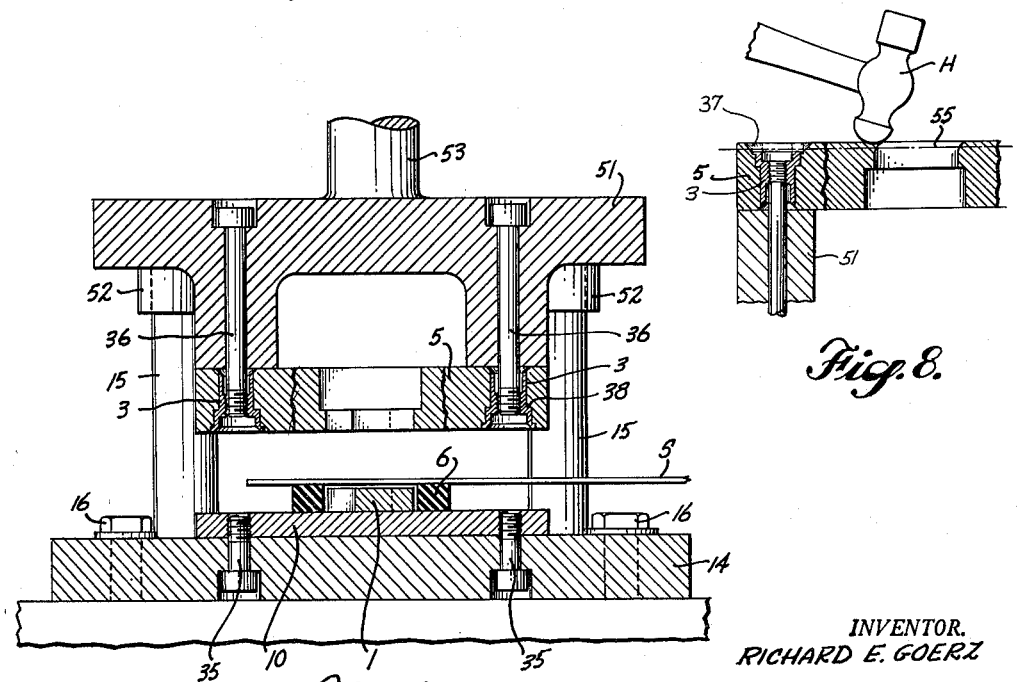
INVENTOR.
RICHARD E. GOERZ
BY
Reynolds & Christensen
ATTORNEYS June 25, 1963  R. E. GOERZ  3,094,886
PROCESS OF MAKING A DIE ASSEMBLY
Filed June 26, 1961  3 Sheets-Sheet 3

INVENTOR.
RICHARD E. GOERZ
BY
Reynolds + Christensen
ATTORNEYS

United States Patent Office 3,094,886
Patented June 25, 1963

3,094,886
PROCESS OF MAKING A DIE ASSEMBLY
Richard E. Goerz, 1431 NE. Boat St., Seattle 5, Wash.
Filed June 26, 1961, Ser. No. 126,455
11 Claims. (Cl. 76—107)

This invention concerns a die assembly for use in limited production, to enable the running of a few hundred to perhaps a few thousand pieces, or in any event a quantity which would be too small to warrant the expense and time required to make a steel punch and a steel die according to usual tool room practices. By it a matching punch and die, for blanking, can be made up quickly and easily, with a minimum of machining, and with such machining to close tolerance as is required only in the punch, which is the simpler to make. Nevertheless the parts of the die assembly will always register accurately and blank cleanly, within the requirements of limited numbers of parts, and can be dismounted from the press and reset therein later with the original accuracy.

Although reference above is to a blanking operation, the invention with slight modifications is adapted to drawing or forming operations. It will be described hereinafter primarily as illustrated by blanking, although the modifications for drawing will also be made clear.

As can be understood by those skilled in this art, a primary object of the invention is to prepare a die assembly at low cost, yet one quite capable of accurate blanking (or forming) during a run of limited numbers of like parts.

It is also an object to insure accurate registry of the punch and the complemental die, when set up in the press, notwithstanding procedures during the making of the die assembly that would tend to destroy such registry, in the absence of precautionary procedures which are part of this invention.

The invention is concerned primarily with a process of making such a die assembly, and relating the punch and the die in the press. The procedural steps and precautions involved will be explained hereinafter. The invention is also concerned with accessories and equipment for use in the process, and peculiarly useful therein.

The drawings illustrate successive steps in the process, the ultimate result, and the accessories needed, both for the blanking operation and for the modified procedures required for drawing a blank.

FIGURE 6 is a cross-sectional view showing further steps towards the completion of the die.

FIGURE 7 is a similar cross-sectional view of the punch and die, still interconnected, but now set up in the die set and in the press, ready for initial separation.

FIGURE 8 is a cross-sectional view illustrating steps in the finishing and final surfacing of the die, now separated from the punch.

FIGURE 9 is a cross-sectional view of the punch and completed die, set up in the press and ready to begin operation.

Figure 1:
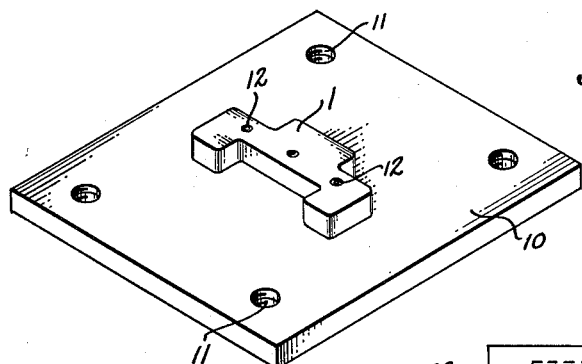
FIGURE 1 is an isometric view of a typical punch, completed and mounted upon a punch plate, and ready for use in the further procedures of this invention.
Figure 3:
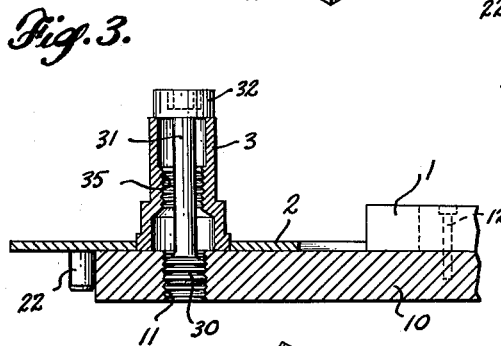
FIGURE 3 is a cross-sectional view through certain parts shown in FIGURE 2.

A brief outline of the process as used in preparing to blank out a typical blank will assist in understanding the more detailed description that will follow. It can be assumed that the part to be blanked is of irregular shape, and non-pierced. Blanking die assemblies made according to this invention are not well adapted to simultaneous piercing operations, and if the blank must be pierced it is advantageous that this operation should precede blanking, and the pierced holes then can serve as a means of registering the strip with the die assembly.

The first step is to machine and finish the punch, usually from steel, in the usual way, and to mount the punch upon a punch plate, which usually is rectangular, to which it remains attached. This punch plate has several threaded locating holes, usually four, in a precise pattern, outside the contour of the punch. Contrary to normal practice the punch during a run is to be below the die, and the punch plate, with the punch uppermost, is later to be held to the punch mount of the die set by screws threaded into the four holes. The holes, however, have other functions in steps leading up to the mounting of the punch plate and punch mount in the die set, as will shortly appear.

Later the die is to be cast, of a zinc-base alloy such as Kirksite, for example, about the punch and on the punch plate. First, however, provision must be made to assure that the punch and die are retained in their initial relationship—the die cast about the punch—while finishing operations are carried out, and until the time comes to separate them after the die has been secured to the die mount and the punch to the punch mount of a die set, which die set has means for guiding interengagement between the two mounts. To do this locating means are made a part of the die, cooperating with locating means on the punch plate, to secure together initially the die and the punch plate, and to engage later similarly located means on the die mount and on the punch mount, respectively. Accordingly, the next step is to apply to the punch plate upstanding steel sleeves which are internally threaded, at the locations of the four holes in the punch plate, yet in a manner that will allow the sleeves to be displaced, in directions parallel to the punch plate, relative to their original location as the cast die metal in which they are embedded cools and shrinks. To do this each sleeve is held by the head of a screw which passes through the sleeve and into the threads of the locating holes in the punch plate. By applying a template to the punch plate to locate the sleeves initially, into which template allowances for shrinkage have been incorporated, and then securing the sleeves to the punch plate with sufficient freedom to move laterally with shrinkage (but not otherwise), their final location within the die will register correctly with the locating holes in each of the punch plate, the punch mount, and the die mount.

The zinc-based alloy die will usually be thicker than the steel punch needs to be for adequate strength, hence in order to avoid using a punch of the full intended thickness of the die a core, of wood, aluminum, or other suitable material, somewhat larger in outline than the punch, is laid upon the punch at least to the thickness overall of the intended die. This core can be held in place on the punch in any suitable manner, as by screws or by weighting it down. The slightly greater size, in outline, of the core later affords clearance for the blank.

Now the punch, core, and punch plate, with the threaded sleeves, are locked within a mold box, and the molten die metal is poured onto the punch plate and about the punch, core, and sleeves. After cooling the gate and runner are sawed off, leaving the die gripping the punch which it surrounds. The metal should not rise above the upstanding sleeves. These sleeves being free to be displaced laterally by shrinkage, and being initially displaced from exact registry with the locating holes by predetermined distances, are brought by shrinkage back into registry therewith. Initially they assist in retaining the die upon the punch plate.

Next the screws which pass through the sleeves and thread into the punch plate are removed, but shorter screws are inserted from the under side of the punch plate, and thread into the sleeves, still embedded within the die metal. This retains the die accurately with relation to the punch and punch plate, as before.

The die's upper surface, the only surface exposed at this stage, will not be smooth nor parallel to the punch plate, and must be, as a surface of reference, so it is surfaced. To avoid damage to the surface tool by surfacing the steel sleeve ends while at the same time surfacing the softer zinc base alloy die, it is helpful to counter-bore the sleeve ends before surfacing the die, so that the surfacing tool will remove only the excess die metal.

The die is still assembled with the punch, the two having never yet been separated. The screws which held the die to the punch plate during the preceding surfacing operation are now removed, and a die mount having holes in the same precise pattern as those in the punch plate is applied to the die's finished surface, by passing screws through the die mount and threading them into the sleeves. The punch and punch plate are mounted, by screws through the same holes in the punch plate and punch mount, so that the punch remains accurately located. The die mount and punch mount should have accurately interfitting guide elements, such as guide posts on the punch plate and bushings on the die mount.

With the punch still embedded within the die, but the two now accurately located on their respective mounts, the die set can be held in a press—usually the die mount on the ram and the punch mount on the table—and by backing off the ram the die separates from the punch without the possibility of cocking. Registration during backing off, and later during operation, is assured by the bushings and the guide posts of the die mount and punch mount, respectively.

Having separated the die from the inverted punch, the core is easily bumped out of the die cavity. This cavity being somewhat larger than the die, allows clearance for the punched pieces, which rise to the top of the die and then can be removed. This, however, is a later step.

The working surface of the die, heretofore concealed but now exposed, will usually not have a sharp cutting edge all around, and it is necessary to insure that it has. The edges of the die, after separation from the punch, are peened to flow the metal close to the punch outline, and to work-harden the alloy. When it is believed that a sharp edge is assured all around, the die on the ram is closed onto the punch. This shears off any excess of the die, which usually is of metal softer than the metal of the punch, and produces a sharp edge. It may be necessary to do this more than once, and the working face of the die will normally have to be surfaced as the final step. Before such surfacing the ends of the sleeves at this surface should be counterbored, for the same reason as before.

Now a stripper of the contour of the punch, made for instance of rubber, is laid upon the punch plate, surrounding the punch. Since it rests upon the punch plate that is held, inverted, in the die set, there is no need to bond it to the punch plate, as would be necessary were the punch above and moving downwardly with the ram. The die assembly is now ready to begin a run.

If piercing is required, holes may be pierced before blanking, and register pins upstanding from the punch can then enter holes already pierced in the strip, and effect registry of the work.

Should it be desired to produce a drawing die set using the principles of this invention, the die is cast about the punch, as described above, and is finished by machining off metal to the thickness of the sheet metal to be drawn. Alternatively, the punch may be coated, before casting the die, with a removable coating that is unaffected by the heat of the molten die metal, and that is of the thickness of the metal to be worked. Except as a pressure pad is required about the punch (about which it can be cast) to grip the flat surface of the blank, and except as an ejector movable through the die cavity is needed, the procedure is as explained above.

I shall now describe the die assembly and the process of making the parts thereof, with reference to the blanking die set shown in the accompanying drawings. The description is intended to be illustrative and not restrictive.

A typical punch is illustrated at 1 mounted upon a punch plate 10 preferably of rectangular form, which punch plate is provided with the four locating holes 11 referred to above, in a precise pattern. If piercing is to be required the strip is preferably pierced in advance of the blanking operation, and register pins may extend upwardly above the working surface of the punch 1 at locations such as are indicated at 12 whereby these pins may constitute register pins entering into the perforations previously pierced in the strip. Otherwise the elements at 12 represent screws to retain the punch upon the punch plate. It will be noted that the punch and punch plate together are not of great thickness. The punch is of steel, made according to normal tool room practice, and the punch plate 10 would normally also be of cast iron or of steel, but is not necessarily as hard as the steel of the punch.

Figure 2:
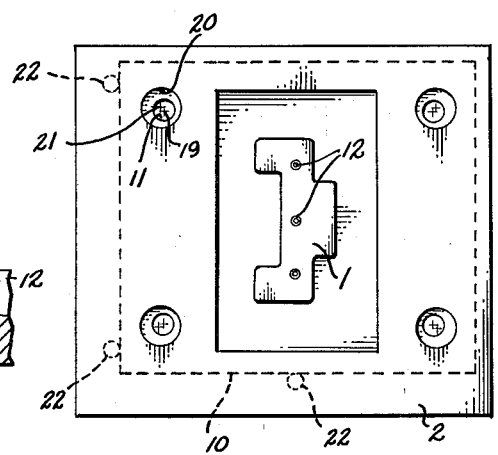
FIGURE 2 is a plan view of the punch and punch plate with a template applied thereto for locating certain screw-threaded sleeves.

With the punch plate positioned as in FIGURE 1 with the punch 1 uppermost a template 2 is applied, as in FIGURE 2, resting upon the upper surface of the punch plate, and having holes 20 which when the template is accurately located relative to the punch plate will differ from the locations of threaded locating holes 11 by distances which are calculated to displace the centers 21 (see FIGURE 2) of the holes 20 from the centers 19 of the locating holes 11 by an amount which will at least approximately compensate for shrinkage in the die metal, and by reason of the shrinkage will bring the two centers 21 and 19 back into correct registry. Location of the template 2 relative to the die plate 10 is accomplished by means such as guide pins 22 which are carried near the edges of the template and which engage corresponding edges of the die plate. The immediate purpose of the holes 20 is to locate steel sleeves 3 which stand up from the template so that these steel sleeves can be retained by screws 31 concentrically with the centers 21 of the holes 20, yet will permit the sleeves 3 later to move inwardly with shrinkage of the die metal cast about them. The screws 31 are threaded at 30 and thread into the internally threaded locating holes 11 in the punch plate until their heads 32 bear upon the upper ends of the sleeves 3, and retain the sleeves in the positions determined by the template 2. The template, of course, is apertured centrally to pass the punch 1.

Figure 4:
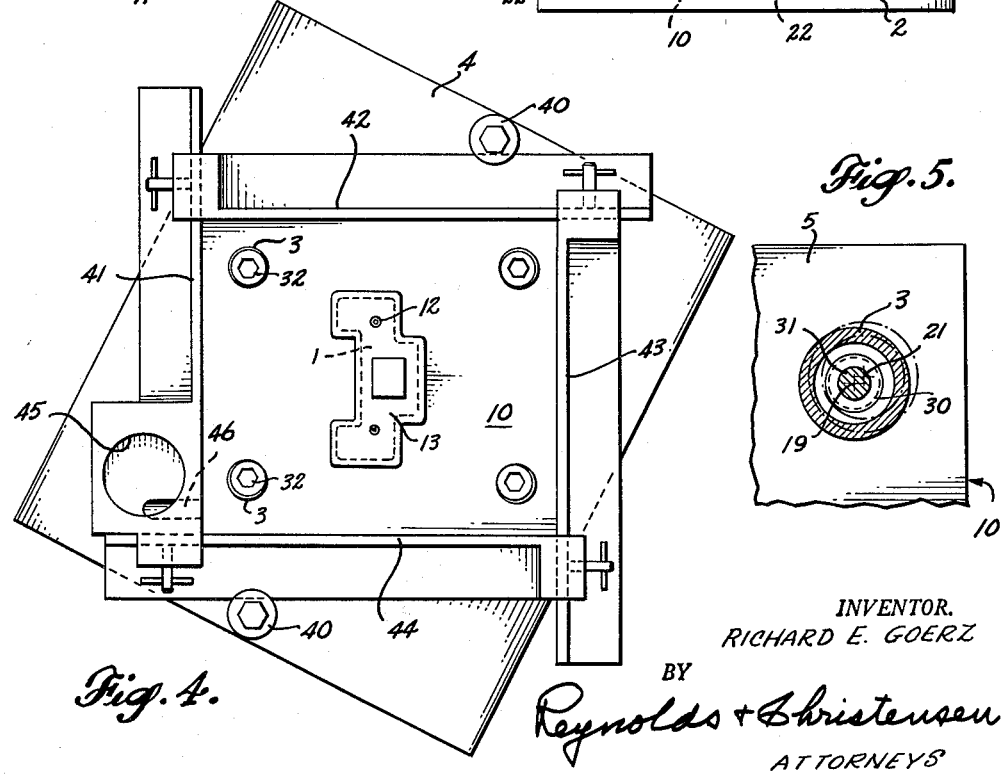
FIGURE 4 is a plan view of the punch and punch plate locked in a mold and ready for the casting of a complemental die.

Now with the sleeves 3 accurately located in relation to the four locating holes 11 of the punch plate, but not so tightly held to the punch plate that they cannot move laterally with shrinkage of die metal, the template 2 is removed. The next step is to cast the die about the punch 1 and sleeves 3, and on the punch plate 10, to do which it is convenient to employ a mold of the adjustable type shown in FIGURE 4. This consists in effect of a table 4 having two undercut washers 40 and a series of four side plates 41, 42, 43, and 44 interfitting and adjustable relative to one another to closely surround and stand above the level of the punch plate 10, and to lock relative to the table 4 by engagement of the undercut washers 40 with the horizontal flanges of opposite side plates, for instance 42 and 44 as shown. One of these side plates is provided with a cup or recess at 45 to receive the molten metal, and a channel 46 to guide the molten metal into the interior of the mold.

The metal used for the die is conveniently a zinc-base alloy metal, for instance Kirksite, which will melt at a reasonably low temperature, will not affect the properties of the steel parts with which it comes into contact, and which can be readily sawed or machined, and which can be work-hardened.

Figure 5:
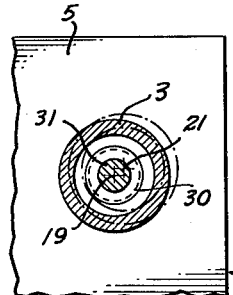
FIGURE 5 is a cross-sectional view to illustrate the pre-allowed shift of a threaded sleeve as the casting cools and sets.

As FIGURE 5 illustrates, the sleeve 3, the center of which before casting was at 21, is shifted inwardly by the shrinkage of the metal when it cools to a location such as 19 which coincides axially more or less, but rather closely, with the axis of the locating hole 11. The molten metal 5 representing the die is cast about the sleeve 3, and rests upon the punch plate 1. It surrounds the punch 1 and securely grips the punch at this stage of the operation.

It should be noted that a core 13 is provided prior to the casting operation, which is somewhat larger in contour than the punch 1, and of a thickness, combined with the thickness of the punch itself, in excess of the intended thickness of the die. The cast metal surrounds the core and embeds it also. The punch plate and die metal 5, with the sleeves 3 embedded in the latter, are shown in FIGURE 6, together with the core 13, as they would be when lifted from the mold, shown in FIGURE 4, with the exception that in FIGURE 6 the now exposed ends of the sleeves 3 are counterbored as indicated at 33 to a level below the intended level of the die at this surface. The next step is to surface the die 5 to a level indicated at 50 (FIGURE 6) and it is immaterial if the core 13, which is of metal softer than the die 5, or of wood or similar soft material, is also surfaced, for this will not harm the surfacing tool. Prior to the surfacing operation the screws 31 had been removed and shorter screws 34 are inserted through the locating holes in the punch plate and are threaded into the threads 35 within the bore of the sleeve 3. This insures that the die which embeds the sleeves 3 remains securely held to the punch plate 10, but the screws 34 being short do not extend upwardly far enough to interfere with the surfacing to the level 50 of the die metal.

Figure 10:
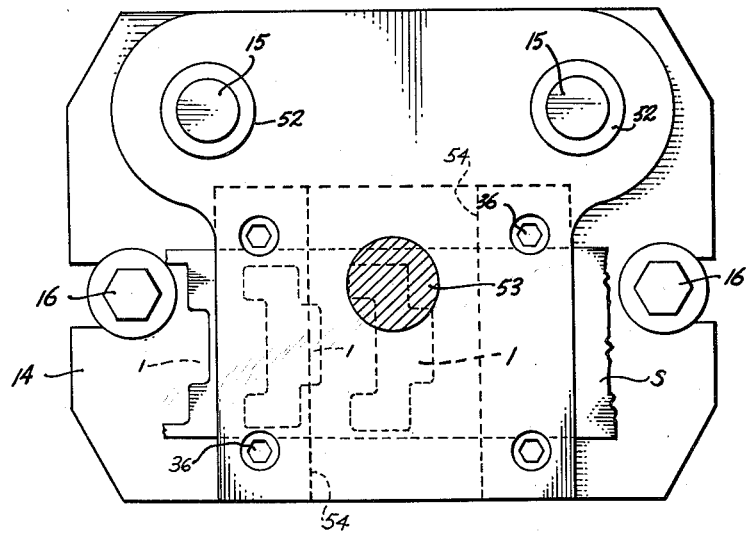
FIGURE 10 is a plan view of the die set, with the punch and the die set up therein.

It is now time to separate the punch from the die. The screws 34 are now removed, although the die still grips the punch and resists any separation. A punch mount 14 is secured to the punch plate 10 through screws 35 which pass through registering holes in the punch mount and are threaded into the locating holes 11 of the punch plate. In similar fashion a die mount 51 is secured to the die 5 by means of screws 36 which pass through holes in the die mount that register with the sleeves 3. Now the die mount 51 is accurately secured with relation to the die 5, and the punch mount 14 is accurately secured in relation to the punch plate 10 and punch 1. The die mount 51 and punch mount 14 are held in accurate registry by guide posts and bushings, as for example the posts 15 upstanding from the punch mount 14, and the bushings 52 carried by the die mount 51 (see FIGURE 10). The die mount and the punch mount are arranged to be fixed respectively to the ram and to the table of the press, as for instance by means of the post 53 on the die mount and the clamping bolts 16 holding down the punch mount. Now by raising the ram of the press the die 5 is lifted directly off the punch 1 and separated from the latter. Shoulders 38 on the sleeve 3 transmit a separating force from the die mount to the die 5. The core 13 may readily be pushed out from below, as for instance by interposing some metal object between the upper surface of the punch 1 and the lower surface of the core 13, and closing the press. The somewhat greater size in outline of the core affords ready clearance for the blanks eventually to be made. It will be noted that the die mount is formed with a recess 54, and the blanks eventually will rise into this recess and can be removed through the open ends thereof.

First, however, it is usually necessary to make the cutting edge of the die sharp all around, for it will often be found that the casting will leave slight radii at some places along the edge. Depending upon the gauge of the strip to be blanked, this edge should usually be made sharp, which can be done by peening the formerly lower surface of the die, now exposed for the first time, inwardly with a ball peen hammer for instance, wherever the edge is not in position to contact the cutting edge of the punch. This flows the metal of the die, and work-hardens it. Any excess metal peened inwardly can be removed by setting up the punch and die in the press and closing the two; the hard punch will shear off any inwardly extending excess of the softer die metal. This edge-producing operation is not always required, for the die may have adequately sharp edges, or they may be made sharp merely by a subsequent die-surfacing operation. Also, the cutting edge of the punch is sharp, and principally governs the sharpness of the edge of the blank; the sharp edge of the die principally governs the sharpness of the edge of the strip, and some lack of sharpness of the die's edge is not usually critical. Moreover, for thicker gauge material being blanked the sharpness of the die edge is less critical then when blanking thinner material; also, for a run of a small number of blanks the original sharpness of the die edge may be adequate, though for larger numbers of blanks it might not be.

If the die edge is peened as just described, it will make the die surface uneven, and then a surface finishing operation should be performed, or, as suggested above, a surface finishing operation can be depended upon, in the absence of a peening operation, to produce an adequately sharp die edge. For example, the die would normally be surfaced to a line such as 55, and in order that this can be done conveniently, the exposed end of the sleeves should be counter-bored as before, as indicated at 37. Even the surface-finishing operation is not always required, for the surface may be adequately planar and its edge adequately sharp, without the surface-finishing or the edge-sharpening operations.

Wherever the finishing of the die's cutting edge or surface is referred to herein, either of the peening or the surfacing operations is to be implied alone, or both thereof, unless the context requires both such operations. Neither may be required, however, so the finishing is to be considered as a desirable but optional operation. If after usage the die's edge becomes dull, it can be re-sharpened by repeating one or the other such finishing operations, or both thereof.

Now the punch and die are reassembled in the press, and the die set is now ready for operation. Closing the die onto the punch with the work strip S between them will punch out the required blank, and it will rise eventually into the cavity 54. It is convenient to provide a stripper 6 of the contour of the punch and surrounding the same, resting upon the punch plate 10, and this stripper may be of rubber. It serves the usual function of a stripper, to strip the strip of metal being worked on from the punch, following each blanking operation.

After a run is completed the punch and the die may be reassembled by screws through the locating holes in the punch plate threaded into sleeves in the die, and the working parts are fully protected against injury and the entire assembly may be set up again upon its mounts and in a press with the same accuracy as before, whenever in the future a re-run is required.

Figure 11:
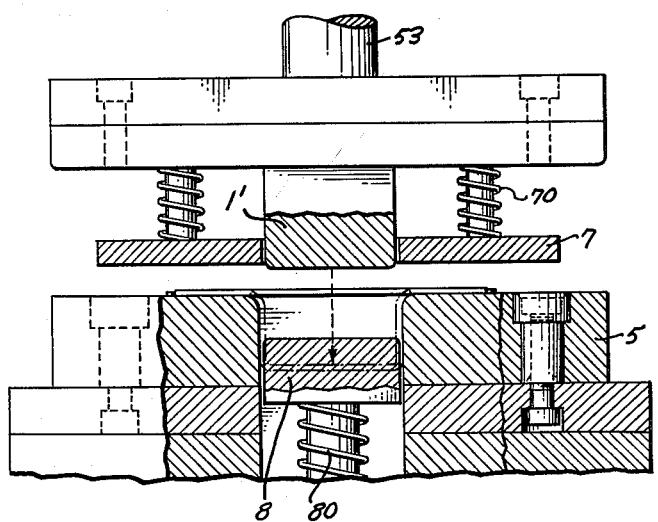
FIGURE 11 is a cross-sectional view of a drawing die and punch, made according to this invention, and set up in operative relation.

The same procedures will serve generally for a drawing die, and such a drawing die is illustrated in FIGURE 11. Here the punch 1' is made up in the usual manner, and then may be coated with a removable coating that will resist destruction by the molten metal, and the die is poured about it, or the die may be poured about the punch directly and then machined out to the required spacing, allowing for the thickness of the metal to be drawn. The die being of soft metal is more easily machined than would be a steel die. The set up in the press includes a pressure pad 7, usually spring-urged by springs 70, and an ejector 8 which moves through the die 5 and which may be spring-urged by the spring 80. Here the die is lowermost and the punch uppermost, contrary to normal drawing practice, and the same might occur in the blanking set-up, but usually it will be found more convenient to invert the blanking punch and die in the manner already described.

I claim as my invention:

1. A process of manufacturing a die assembly which comprises finishing a punch of the required contour; mounting the same upon a punch plate which has threaded holes located in a precise pattern outside the punch contour; securing an internally threaded sleeve shiftably upon the punch plate at each hole location, but misaligned from such location by distances equivalent to the shift due to shrinkage of die metal later cast about the punch and the sleeves; casting a die about the punch and the sleeves, thereby displacing the sleeves, by reason of shrinkage of the die metal, into registry with the holes in the punch plate; clamping each sleeve upon the punch plate by screws through the punch plate and threaded into the sleeves, and so fixing the cast die still embedding the punch, with relation to the punch plate; finishing the exposed surface of the die parallel to the surface of the punch plate; removing the screws from the sleeves and securing a die mount to the die by screws through locating holes in the same pattern in the die mount and threaded into the sleeves embedded in the die, and a punch mount, guided from the die mount for rectilinear movement, to the punch plate by screws through locating holes in the same pattern in the punch mount and threaded into the locating holes in the punch plate, while the punch and die are still interengaged; mounting the die set, including the die and the die mount, and the punch, the punch plate and the punch mount, in a press, and separating the die from the punch by withdrawal of the press ram; effecting contact of the newly exposed die surface with the punch, round about the contour of the latter; and surfacing the newly exposed surface of the die complementally to the surface of the punch plate.

2. A process of manufacturing a die assembly which comprises finishing a punch of the required contour; mounting the same upon a punch plate which has threaded locating holes located in a precise pattern outside the punch contour; securing an internally threaded sleeve upstanding from the punch plate at each hole location, but offset axially from its hole in a direction and by a distance equivalent to the shift of such sleeve due to shrinkage of die metal later cast about the punch and the sleeves, the sleeves being secured with sufficient freedom to allow their shifting thus back into axial alignment with the locating holes; casting a die about the punch and the sleeves, and by shrinkage of the cast metal restoring the sleeves to axial alignment with the locating holes; securing the punch and punch plate to the die by screws through the locating holes and threaded into the sleeves; finishing the exposed surface of the die; securing the punch to a punch mount by passing screws through locating holes in the same pattern in the punch mount and threading them into the locating holes in the punch plate, after first removing the screws holding the punch to the die; securing the die to a die mount by passing screws through locating holes in the same pattern in the die mount and threading them into the sleeves embedded within the die; guiding the die mount and punch mount for rectilinear movement; separating the die from the punch by a force in the direction of such guiding movement; flowing the die metal inwardly to insure contact with the punch at all points; and finishing the working surface of the die.

3. A process of manufacturing a die assembly which comprises finishing a punch of the required contour; mounting the same upon a punch plate which has first locating elements in a precise pattern outside the punch contour; securing complemental second locating elements upon the punch plate in positions offset from registry with the first locating elements by distances equivalent to the shift of the second locating elements by shrinkage of die metal wherein they are later embedded; casting a die about the punch and the second locating elements, and by shrinkage restoring the second locating elements to registry with the first locating elements; securing the several aligned pairs of locating elements together; finishing the exposed surface of the die; releasing the aligned pairs of first and second locating elements, and securing the first locating elements to third locating elements in the same pattern on a punch mount which is guided for rectilinear movement relative to a complemental die mount, and securing the second locating elements to fourth locating elements arranged in the same pattern on such die mount; and separating the die and die mount from the punch and punch mount by relative movement in the direction of guidance.

4. A process as in claim 3, including the further step of finishing the die to produce a sharp cutting edge.

5. A process as in claim 4, wherein the operation of finishing the die comprises flowing the metal inwardly towards the die cavity to positions where the die will contact the punch at all points about its cutting edge.

6. A process as in claim 4, wherein the operation of finishing the die comprises surfacing the working surface of the die to define a sharp blanking contour entirely about the die, for cooperating with the punch's cutting edge.

7. A process as in claim 4, wherein the operation of finishing the die comprises flowing the metal inwardly towards the die cavity to positions where the die will contact the punch at all points; and finishing the working surface of the die to define a sharp blanking contour entirely about the die, and cooperating with the punch.

8. A process as in claim 3, wherein the finishing operation of the die's working surface comprises establishing clearance between the cooperating surfaces of the punch and die equivalent to the thickness of metal to be drawn, the process including the further step of forming a pressure pad surrounding the punch and urged into contact with the metal to be drawn, surrounding the die cavity.

9. A process as in claim 8, wherein the pressure pad is cast about the punch.

10. A process as in claim 8, wherein clearance is established between the punch and die by removal of metal from the die after casting the die about the punch.

11. A process as in claim 8, wherein clearance is established between the punch and the die by surrounding the punch, prior to casting the die, with a removable casing equivalent in thickness to the metal to be drawn, and removing such casing after separation of the punch and die.

References Cited in the file of this patent

UNITED STATES PATENTS

| | | |
|---|---|---|
| 2,384,229 | Ammann | Sept. 4, 1945 |
| 2,681,027 | Boll | June 15, 1954 |
| 2,821,156 | Lyon | Jan. 28, 1958 |
| 2,850,924 | Hempel | Sept. 9, 1958 |
| 2,939,347 | Tobey | June 7, 1960 |